United States Patent [19]

Causey

[11] 4,067,351
[45] Jan. 10, 1978

[54] HYDRAULIC VENT VALVE

[75] Inventor: Lynn R. Causey, Baton Rouge, La.

[73] Assignee: Ethyl Corporation, Richmond, Va.

[21] Appl. No.: 718,848

[22] Filed: Aug. 30, 1976

Related U.S. Application Data

[63] Continuation-in-part of Ser. No. 546,276, Feb. 3, 1975, abandoned.

[51] Int. Cl.² ............................................. F16K 9/00
[52] U.S. Cl. ..................................... 137/254; 137/574
[58] Field of Search ............... 137/254, 253, 252, 251, 137/247, 574; 114/212

[56] References Cited

U.S. PATENT DOCUMENTS

| 1,243,604 | 10/1917 | Honeywell | 137/254 X |
|---|---|---|---|
| 3,126,906 | 3/1964 | Touzalin | 137/254 X |
| 3,187,765 | 6/1965 | Frank | 137/253 |
| 3,237,637 | 3/1966 | Ainsworth | 137/251 |

Primary Examiner—Alan Cohan
Attorney, Agent, or Firm—Donald L. Johnson; John F. Sieberth; James M. Pelton

[57] ABSTRACT

A hydraulic vent valve for use on ship cargo tanks is disclosed which is utilized to maintain a constant head of pressure or vacuum on containerized fluid and to provide leakproof isolation between the stored fluid and the atmosphere. The valve features a reservoir, a divider for dividing the reservoir into two chambers, an aperture in the divider through which liquid can flow, reservoir liquid in each of the chambers in an amount sufficient to cover the aperture when pressures inside of the chambers are equal, an intake connected to the reservoir for communicating pressures on the stored fluid to the surface of the reservoir liquid in one of the chambers and an exhaust for communicating atmospheric pressure to the surface of the liquid in the other chamber.

4 Claims, 7 Drawing Figures

HYDRAULIC VENT VALVE

CROSS-REFERENCE TO RELATED APPLICATION

This application is a Continuation-in-part of application Ser. No. 546,276, filed Feb. 3, 1975, now abandoned.

BACKGROUND OF THE INVENTION

The storage of fluids in closed containers on ships requires pressure relief to allow for changes in pressures in the containers as the fluids contract and expand through diurnal heating and cooling. Compensation for pressure changes in storage tanks by venting is especially important when transporting cargo by sea. As can be appreciated, dangerous high pressure or vacuum differentials between the ship's cargo tanks and the atmosphere could cause container rupture with explosive force, damaging the vessel and even resulting in loss of lives and equipment. At this time fluid cargo shipped by sea is vented by conventional vent valves which have moving mechanical parts which require mechanical maintenance. Also due to the corrosiveness of the sea air and the sea water itself, mechanical failure of these valves due to corrosion is commonplace. As can be appreciated, if the mechanical valves should fail an extremely dangerous situation will exist.

Hydraulic pressure-vacuum valves are known, but heretofore none have been considered for operation on ships at sea. The reason for this is that the motion of ships at sea, especially during storms, is often times greater than 30° from the vertical. In such motion the liquid seal on conventional hydraulic valves is lost resulting in loss of pressure or vacuum in the ship's cargo tanks. Loss of pressure or vacuum in such instances could result in loss or contamination of the fluid cargo being transported.

Therefore it is an object of this invention to provide a hydraulic valve which will maintain a constant pressure or vacuum in a ship's cargo tank, which will also provide for equalization of high pressure differentials between the outside of the container and the inside of the container, which has no mechanical moving parts and which is fail-safe at an angle of greater than 30° from the vertical.

THE INVENTION

This invention relates to a hydraulic pressure-vacuum valve for maintaining a constant head of pressure on a containerized fluid and for providing relief of pressure differentials between the pressure outside of the container and inside of the container which valve comprises: a reservoir, at least one dividing means inside of said reservoir for separating the reservoir into at least two chambers, the dividing means having at least one passway aperture through which liquid can pass from chamber to chamber, a reservoir liquid contained within said reservoir in an amount to at least cover said passway aperture when the pressure in the chambers is equal, at least one intake port in the reservoir for communicating the pressure under which said fluid is stored to the surface of the liquid in one of the chambers and at least one exhaust port in the reservoir for communicating atmospheric pressure to the surface of the liquid in another of the chambers.

Preferably, the present invention provides a hydraulic pressure-vacuum valve for maintaining a constant head of pressure or vacuum on a fluid in a shipboard cargo tank, said valve being free of mechanical parts and fail-safe in oscillatory motion in any direction up to 45° from the vertical axis of said valve, which comprises a reservoir having top, side and bottom walls defining the body of said valve; two ports located in the upper portion of said reservoir, one of which communicates with the cargo tank and the other of which communicates with the atmosphere; a dividing plate which sealably separates the upper portion of said reservoir into two chambers, one of which communicates through one of said ports to the cargo tank and the other of which communicates through the other of said ports to the atmosphere, said dividing plate extending to the bottom wall of said reservoir and having a passway aperture in the shape of an inverted V located in said dividing plate adjacent said bottom wall for communication between said chambers of said reservoir; and a reservoir liquid in an amount sufficient to hold the desired pressure or vacuum on the fluid in said shipboard cargo tank such that a pressure or vacuum greater than that desired in said shipboard cargo tank depresses said reservoir liquid in one of said chambers to a point below said aperture to relieve the excess pressure or vacuum to the desired level.

Preferably the exhaust and intake ports should be located at the top of the container while the passway aperture should be located near the bottom of the container. In a preferred form the valve of this invention features the passway aperture having an isosceles triangular shape with the base of the triangle substantially parallel to the horizon. Such a shape is desired as swaying of the liquid in the reservoir due to ship roll will not adversely affect the operation of the valve. The isosceles triangular shape is preferred as the aperture will not be exposed to the gas over the reservoir liquid as the ship rolls to either side even though the reservoir liquid level is down to the apex of the triangle. The greater the angles at the base of the triangle, the more severe rolling can be tolerated by the reservoir.

The vent of this invention is suitable as a pressure maintainer and venting means on containerized fluid cargo be it a liquid or gas. Should the cargo be a liquid, the apparatus of this invention is preferably utilized in conjunction with an inert gaseous blanket over the liquid, which gaseous blanket will be in communication with the liquid in at least one of the valve chambers. Should the fluid cargo be a gas, the stored gas itself will be communicated to at least one of the valve chambers. These and other features of the invention contributing satisfaction in use and economy in manufacture will be more fully understood from the following description of a preferred embodiment of this invention when taken in connection with the accompanying drawings, wherein identical numerals refer to identical parts and in which:

Figure 1:
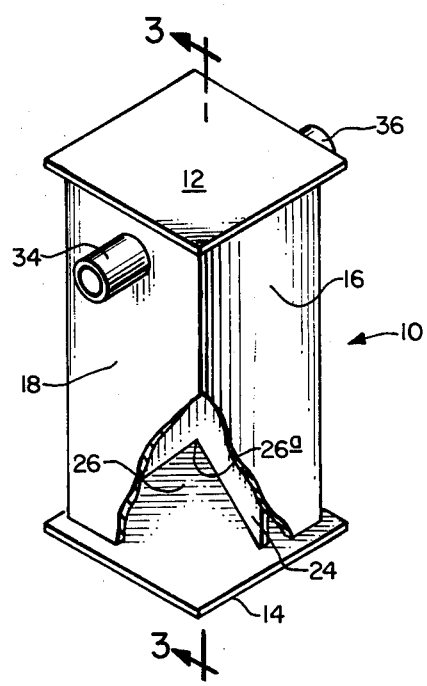
FIG. 1 is a perspective view of an embodiment of this invention.
Figure 2:
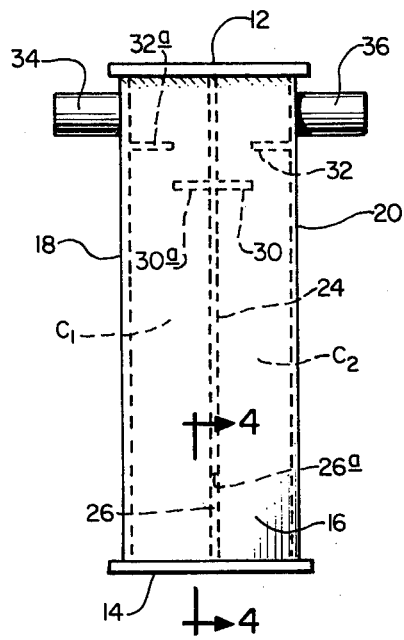
FIG. 2 is a side elevational view of the embodiment shown in FIG. 1.

Referring now to FIGS. 1–4, it can be seen that the illustrated vent of this invention comprises a reservoir, generally designated by the numeral 10, which comprises top wall 12, bottom wall 14, and sidewalls 16, 18, 20 and 22. Separating reservoir 10 into two separate chambers is divider plate 24 which extends from top wall 12 down to bottom wall 14. Cut into the bottom portion of divider plate 24 is passway aperture 26. Aperture 26, as shown in the embodiment illustrated, is an isosceles right triangle. It should be pointed out that other configurations for passway aperture 26 may be used as the demand requires.

An isosceles triangle configuration is preferred as it allows for maintenance of a desired pressure head without venting even when the liquid level in one of the chambers is at the apex of the triangle and the valve is swaying. A highly preferred configuration for passway aperture 26 is an isosceles right triangle which will provide for non-venting and maintenance of head pressure even though the vent valve is rolled to a 45° pitch from the vertical.

Also located in reservoir 10 are baffle plates 30, 30a, 32 and 32a which, as can be seen from the drawings, extend from the walls of reservoir 10 and from divider plate 24. These baffles act to reduce splashing of the reservoir liquid and any loss resulting thereby.

To communicate pressure from the cargo container to chamber $C_1$ is intake port 34. Attached to port 34 will be any convenient means, such as hose or pipe, which will run from the cargo container to intake port 34.

Exhaust port 36 is located on reservoir 10 so that it provides for communication of the atmosphere with chamber $C_2$.

Partially filling chambers $C_1$ and $C_2$ is reservoir liquid L. It is preferred that the reservoir liquid be a non-corrosive liquid and one which is inert to the gaseous blanket or gaseous cargo which it will be in contact with. It has been found that oil is a very suitable liquid. The amount of liquid utilized should be that amount which is sufficient to maintain a level in chambers $C_1$ and $C_2$ so as to at least exceed the highest point of passway aperture 26 when the pressure in chambers $C_1$ and $C_2$ are substantially equal. Should it be necessary to maintain a high head of pressure over the cargo, it will be necessary to add more liquid so that the height of the liquid in $C_2$ measured from the level of the liquid to the highest point of passway aperture 26 or to the height of the liquid in chamber $C_1$ equals the head pressure desired.

The cross-sectional areas of chambers $C_1$ and $C_2$ can be varied as the need arises. It has been found that when large pressure surges are to be relieved that the cross sections of chambers $C_1$ and $C_2$ should be sufficiently large so as to prevent entrainment of oil in the escaping gas. In other words, a large cross-sectional area for chambers $C_1$ and $C_2$ will be necessary when relief of high pressure surges is expected as, for example, in loading or unloading cargo. Baffles 30, 30a, 32 and 32a will also aid in preventing loss of reservoir liquid L during venting. It should also be noted that the apparatus of this invention not only acts to relieve excess pressures which are built up inside of the cargo container, but it also may be utilized to aid in relieving pressure drops or vacuum which occur in the container. When relieving pressure drops, the valve of this invention operates in a manner opposite to that when excess container pressure is being relieved, i.e., the exhaust port 36 becomes the intake and intake port 34 becomes the exhaust.

Figure 3:
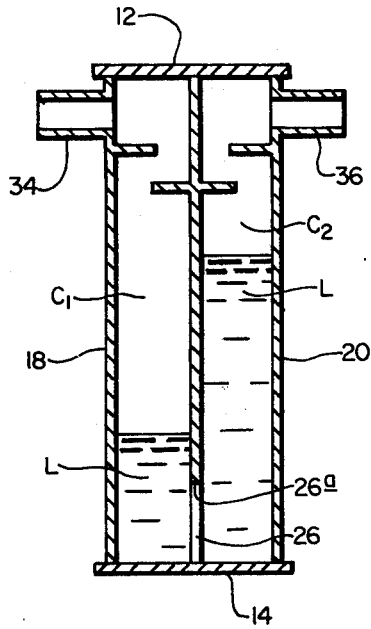
FIG. 3 is a sectional view taken along section lines 3—3 of FIG. 1 showing the position of the reservoir liquid when the valve maintains a constant head of pressure on the stored cargo without venting.
Figure 3A:
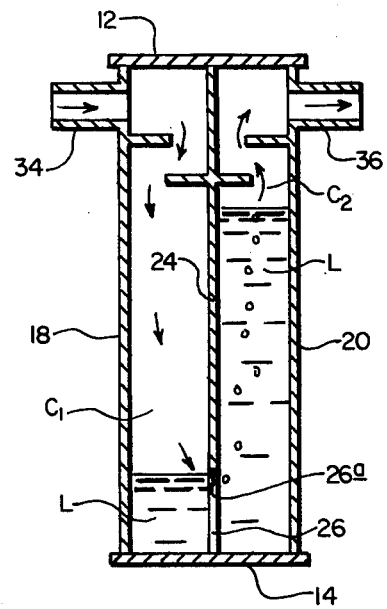
FIG. 3A is a sectional view taken along section lines 3—3 of FIG. 1 showing the reservoir liquid level when the cargo pressure has exceeded the desired head pressure and venting occurs.
Figure 4:
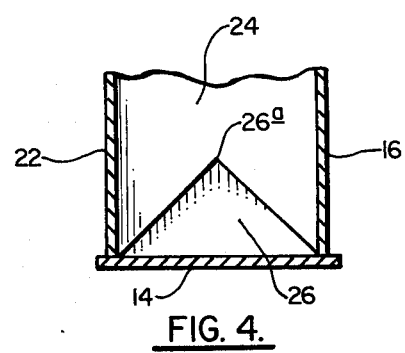
FIG. 4 is a sectional view taken along section lines 4—4 of FIG. 2.

Referring now to FIGS. 3 and 3A, the two operating modes of the apparatus of this invention are depicted, i.e., the head pressure maintenance mode and the venting mode. FIG. 3 shows the apparatus of this invention when the apparatus is acting to maintain a constant head pressure on the cargo. The pressure maintained will be that amount of pressure exerted by the height of liquid L in chamber $C_2$ measured to the level of the liquid in chamber $C_2$. If a higher head pressure is desired, then more liquid is added to the reservoir. FIG. 3A shows the venting mode of the apparatus of this invention. As can be seen from the drawing, as the pressure increases the level of liquid L in chamber $C_1$ is reduced to where it is below passway aperture 26. In the case of an isosceles triangle, liquid L in chamber $C_1$ will be lowered until gas can escape between the surface of the liquid and the apex of the triangle. The gas will escape into chamber $C_2$ and will bubble up through the liquid L in chamber $C_2$ and be vented out of exhaust port 36. This venting will continue to occur until the pressure in the cargo container is reduced so that the liquid in chamber $C_1$ will rise up again above the highest point of passway aperture 26.

Figure 5:
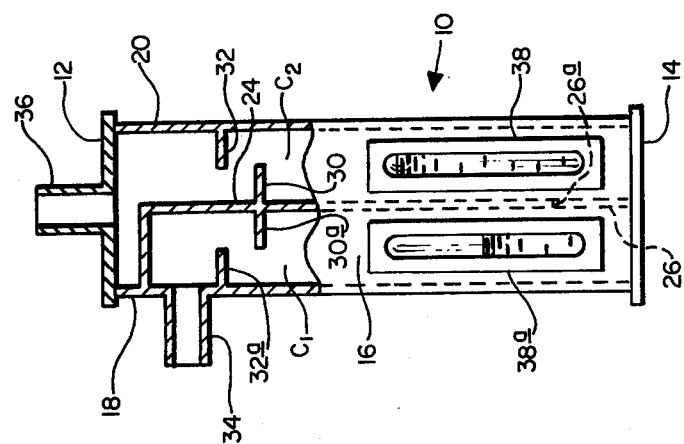
FIG. 5 is a partial sectional view of another preferred embodiment of the invention showing one port located in the top wall and the divider plate positioned to separate the two ports.

Referring now to FIG. 5, an additional embodiment of the hydraulic pressure vacuum valve of this invention is illustrated in cutaway sectional view. According to this embodiment, exhaust port 36 is located in top wall 12 and divider plate 24 extends from side wall 18 down to bottom wall 14 separating reservoir 10 into two separate chambers. Also added to this embodiment are two sight glasses 38 and 38a which are conveniently installed to read the level of reservoir liquid L in the chambers $C_1$ and $C_2$. Calibration of the level of reservoir liquid L allows easy reading of the pressure or vacuum in the cargo tank.

Figure 6:
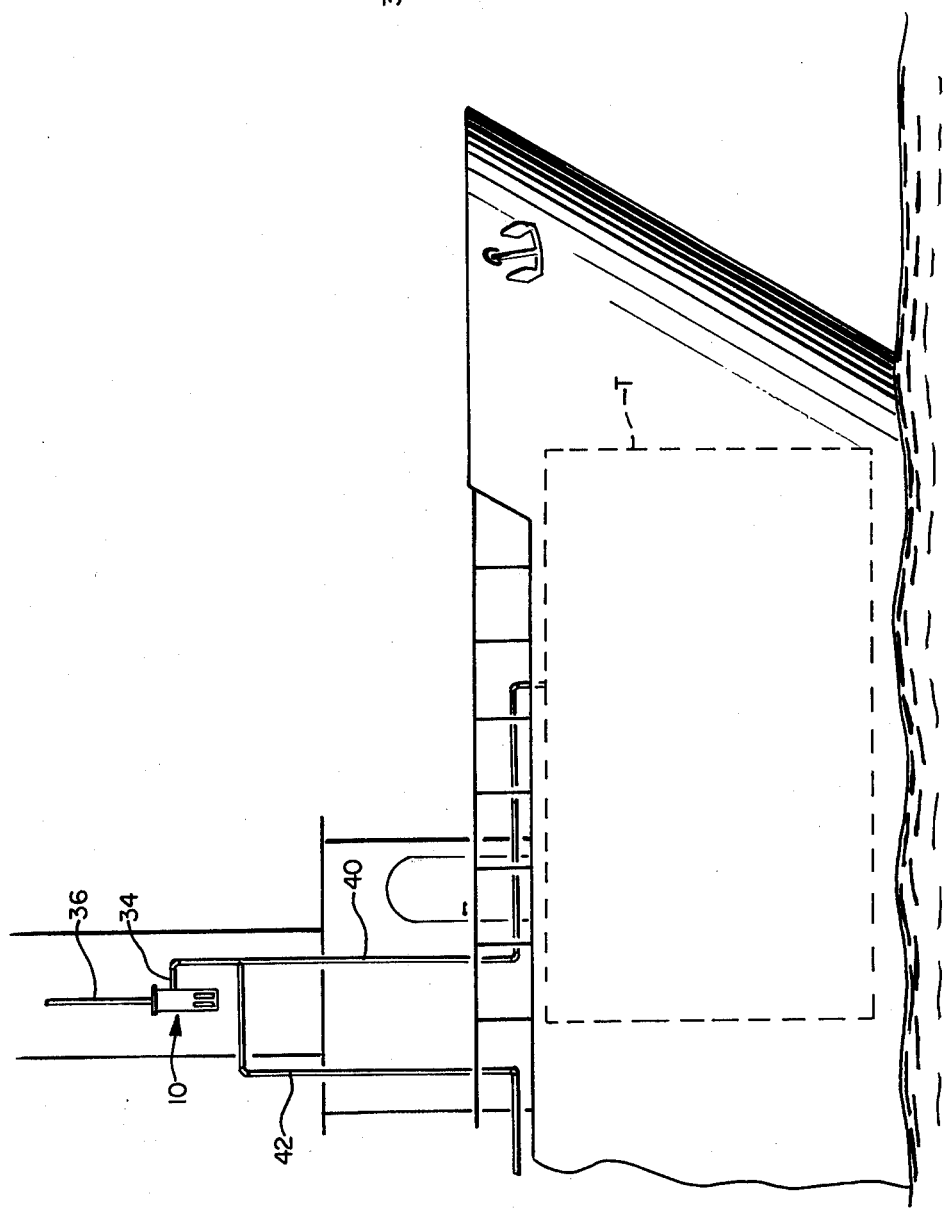
FIG. 6 is a pictorial illustration of one embodiment of the invention installed on a ship.

Referring now to FIG. 6, the installation of the apparatus of this invention on a ship is pictorially represented. A cargo tank T communicates by means of a vent line 40 with port 34 to reservoir 10. Inert pressurizing gas line 42 communicating with vent line 40 serves to restore desired pressure lost through venting of gas through reservoir 10 to the atmosphere through exhaust port 36. Although this illustration is extremely simplified, not showing appropriate valves and additional lines and hydraulic pressure-vacuum valve units for use on additional cargo tanks, it nevertheless represents one method of installing the present invention in use.

The apparatus of this invention has many desirable features. For one, the venting pressure can be varied by merely changing the fill level of reservoir liquid L. Also the vent valve of this invention remains permanently leakproof for desired pressures. Furthermore, when dealing with seafaring cargo the vent valve of this invention is fail-safe as it cannot stick either in the open or in the closed position. It is also important to note that the valve of this invention has no moving parts which require mechanical maintenance and which would be apt to fail from corrosion.

The material of construction of the valve of this invention can be any material which is structurally sound enough and which is not corroded by materials which will come in contact with it. Exemplary of suitable material are steel, stainless steel, thermoplastics, etc.

What is claimed is:

1. A hydraulic pressure-vacuum valve for maintaining a constant head of pressure or vacuum on a fluid in a shipboard cargo tank, said valve being free of mechanical parts and fail-safe in oscillatory motion in any direction up to 45° from the vertical axis of said valve, which comprises a reservoir having top, side and bottom walls defining the body of said valve; two ports located in the upper portion of said reservoir, one of which communicates with the cargo tank and the other of which communicates with the atmosphere; a dividing plate which sealably separates the upper portion of said reservoir into two chambers, one of which communicates through one of said ports to the cargo tank and the other of which communicates through the other of said ports to the atmosphere, said dividing plate extending to the bottom wall of said reservoir and having a passway aperture in the shape of an inverted V located in said dividing plate adjacent said bottom wall for communication between said chambers of said reservoir; and a reservoir liquid in an amount sufficient to hold the desired pressure or vacuum on the fluid in said shipboard cargo tank such that a pressure or vacuum greater than that desired in said shipboard cargo tank depresses said reservoir liquid in one of said chambers to a point below said aperture to relieve the excess pressure or vacuum to the desired level.

2. The valve of claim 1 wherein said reservoir has a rectangular configuration in vertical cross-section.

3. The valve of claim 1 wherein said aperture has the configuration of an isosceles triangle having its base substantially parallel to the horizon.

4. The valve of claim 1 wherein said passway aperture is an isosceles right triangle having its base adjacent the bottom of said reservoir and substantially parallel to the horizon.

* * * * *